United States Patent
Ikuta et al.

(10) Patent No.: US 8,303,153 B2
(45) Date of Patent: Nov. 6, 2012

(54) PLANAR LIGHT SOURCE DEVICE (75) Inventors: Kazuya Ikuta, Osaka (JP); Sumito Nishioka, Osaka (JP); Kohyuh Sakai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/865,313

(22) PCT Filed: Jan. 29, 2010

(86) PCT No.: PCT/JP2010/000552
§ 371 (c)(1),
(2), (4) Date: Mar. 11, 2011

(87) PCT Pub. No.: WO2011/043003
PCT Pub. Date: Apr. 14, 2011

(65) Prior Publication Data
US 2012/0182761 A1    Jul. 19, 2012

(30) Foreign Application Priority Data
Oct. 9, 2009   (JP) ................. 2009-235739

(51) Int. Cl.
*F21V 33/00* (2006.01)
(52) U.S. Cl. .............. 362/616; 362/628; 362/97.3
(58) Field of Classification Search ............ 362/601, 362/616, 628, 97.3, 612, 613
See application file for complete search history.

(56) References Cited

U.S. PATENT DOCUMENTS

| | | |
|---|---|---|
| 2005/0174803 A1 | 8/2005 | Hayashi et al. |
| 2008/0030650 A1 | 2/2008 | Kitagawa et al. |
| 2008/0285310 A1 | 11/2008 | Aylward et al. |
| 2009/0279020 A1 | 11/2009 | Tanabe |
| 2011/0026274 A1* | 2/2011 | Bourdelais et al. ........... 362/613 |
| 2011/0038178 A1* | 2/2011 | Kuwayama et al. .......... 362/616 |

FOREIGN PATENT DOCUMENTS

| | | |
|---|---|---|
| CN | 1646855 | 7/2005 |
| CN | 101128697 | 2/2008 |
| CN | 101329472 | 12/2008 |
| CN | 101460887 | 6/2009 |
| JP | 2008-34372 | 2/2008 |
| JP | 2009-43706 | 2/2009 |
| JP | 2009-110794 | 5/2009 |

* cited by examiner

*Primary Examiner* — Laura Tso
(74) *Attorney, Agent, or Firm* — David G. Conlin; Steven M. Jensen; Edwards Wildman Palmer LLP (57) ABSTRACT

A planar light source device (10) of the present invention, includes: a plurality of light guides (21) being provided such that longer sides thereof are arranged in parallel with each other with a gap therebetween; a plurality of light sources each of which causes light to be directed from at least one of opposite end surfaces of the light guide (21) in the longitudinal direction of the light guide (21); a diffusing plate (15) being provided on a light emission side of the light guide (21) to extract light guided inside the light guide (21); and supports (31) for supporting the gap (22) between the light guides (21) at predetermined intervals. The supports (31) are made from a light-transmissive and light-scattering material. This makes it possible to provide a planar light source device that enables reduction in the occurrence of luminance unevenness caused by the support which supports the light guides.

5 Claims, 9 Drawing Sheets

PLANAR LIGHT SOURCE DEVICE

TECHNICAL FIELD

The present invention relates to a planar light source device for use as a backlight that includes a side-edge type (also referred to as side-light type) light guide plate through which light from a light source is planarly emitted, for sliming down of a liquid crystal display apparatus, for example.

BACKGROUND ART

In recent years, many liquid crystal display apparatuses have used backlights including a side-edge type (also referred to as side-light type) light guide plate through which light from a light source is planarly emitted, for sliming down thereof.

Figure 11:
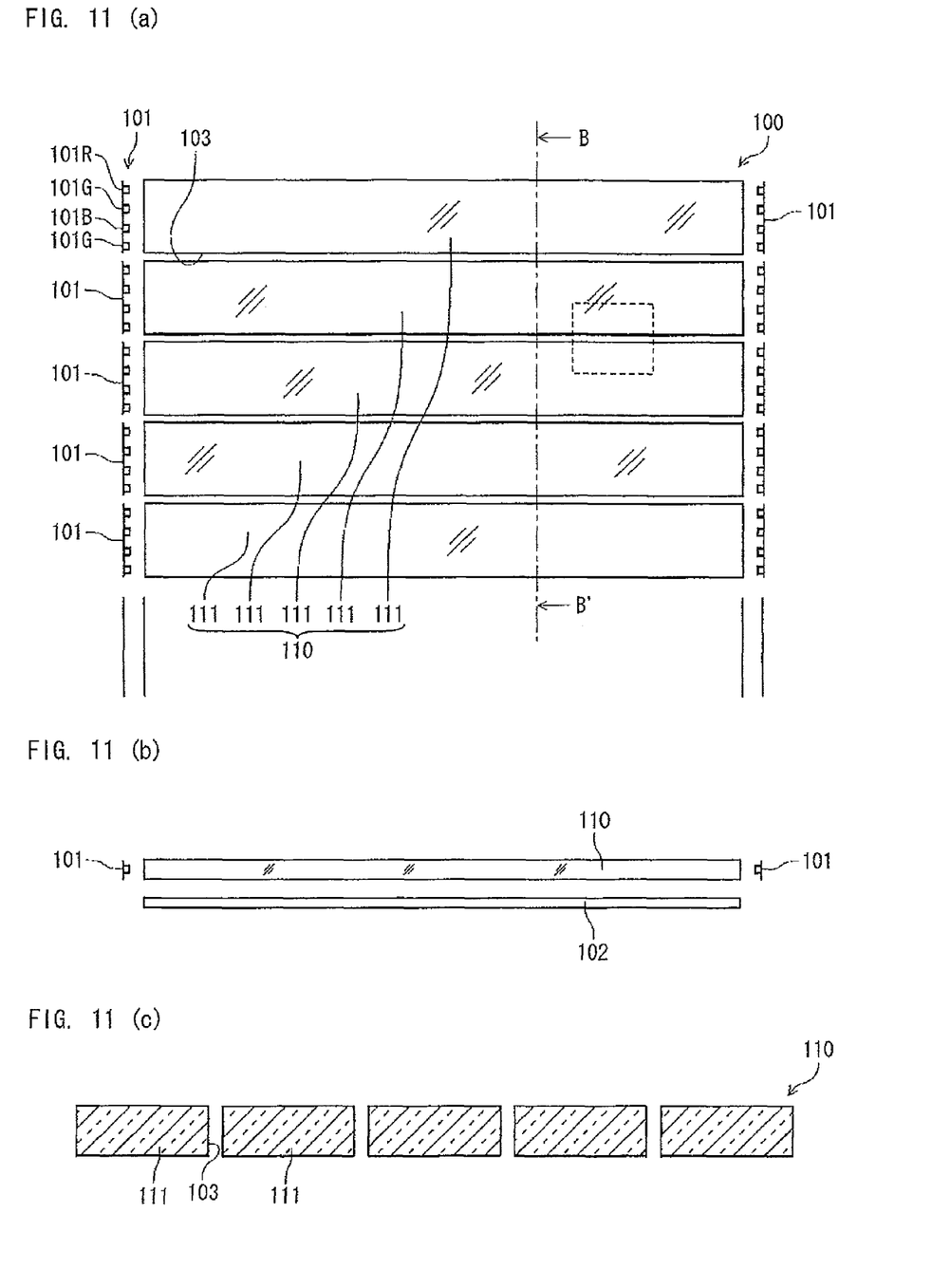
FIG. 11(a) is a plan view showing the structure of the conventional light source module.
FIG. 11(b) is a front view showing the structure of the light source module shown in FIG. 11(a).
FIG. 11(c) is a cross-sectional view taken along the line B-B' in FIG. 11(a).

As an example of such a side-edge type light guide plate, an illumination device is disclosed in Patent Literature 1, for example. As shown in FIGS. 11(a), 11(b), and 11(c), an illumination device 100 disclosed in Patent literature 1 has: a light guide plate 110 consisting of a plurality of light guides 111 arranged in a row; and a plurality of light sources 101 that is provided for each of the light guides 111 of the light guide plate 110 and irradiate the light guides 111 with light. Each of the light sources 101 consists of one red LED (Light Emitting Diode) 101R, two green LEDs 101G, and one blue LED 101B. Under the light guide plate 110, a reflecting sheet 102 is provided. Between the adjacent light guides 111, gaps 103 are formed. The gaps 103 are air layers of not less than 0.1 μm. With this arrangement, pseudo impulse-type display is realized.

Further, a light-emitter structure of the same kind is disclosed in Patent Literature 2, for example.

Citation List

Patent Literature 1

Japanese Patent Application Publication, Tokukai, No. 2008-34372 A (Publication Date: Feb. 14, 2008)

Patent Literature 2

Japanese Patent Application Publication, Tokukai, No. 2009-43706 A (Publication Date: Feb. 28, 2009)

SUMMARY OF INVENTION

Technical Problem

In order to arrange the plurality of separate light guides 111 of the light guide plate 110 so that their longer sides are in parallel with each other, the gaps 103 are required each in the order of 1 to 2 mm in consideration of thermal expansion and manufacturing tolerances of the light guides 111.

Figure 12:
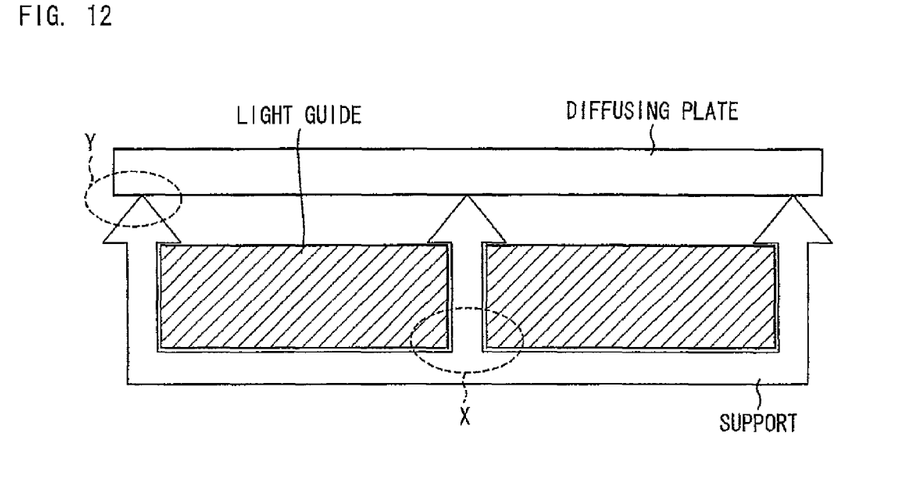
FIG. 12 is a schematic cross-sectional view showing the state where light guides are supported by a support in the conventional light source module.

When the gap 103 of such a length is left, it is necessary to additionally provide a support, as shown in FIG. 12, for example, so that the light guides 111 are fixed at predetermined positions.

As shown in FIG. 12, the support is provided to support the light guides at predetermined intervals. In a case where the support is made from a material that does not allow light to pass through it (highly reflective PC (polycarbonate), etc.), light emitted from the side walls of the light guides is blocked by the support in an area X where the light guides are very close to each other. In addition, light emitted from the light guides is blocked in an area Y where the support is closer to the diffusing plate than the light guide. This results in lower luminance. This clearly forms light and dark patterns in and around the position where the support 31 is provided, resulting in luminance unevenness.

As described above, in a case where the support is provided to fix the light guides at the predetermined positions, there occurs the luminance unevenness caused by the support.

In view of the above problem of the conventional arrangement, the present invention has been attained. An object of the present invention is to provide a planar light source device that enables reduction of the occurrence of luminance unevenness caused by a support for supporting light guides, and an electronic apparatus including the planar light source device.

Solution to Problem

In order to solve the above problem, a planar light source device of the present invention includes: a plurality of light guides being provided such that longer sides thereof are arranged in parallel with each other with a gap therebetween; a plurality of light sources each of which causes light to be directed from at least one of opposite end surfaces of the light guide in the longitudinal direction of the light guide; a plurality of optical path changing sections being provided on a light emission side of the light guide or on a reflecting sheet side opposite the light emission side, to extract light guided inside the light guide; and supports for supporting the light guides at predetermined intervals, the supports being made from a light-transmissive and light-scattering material.

According to the above arrangement, the supports for supporting the light guides at the predetermined intervals are made from a light-transmissive and light-scattering material, which can prevent the possibility of lower luminance in the gap between the light guides. That is, the support, by virtue of its light-transmissive property, does not block light emitted from side wall surfaces of the light guides. Further, the support, by virtue of its light-scattering property, scatters light emitted from the side wall surfaces, which irradiates the gap between the light guides with light having uniform luminance.

Consequently, it is possible to reduce the occurrence of luminance unevenness caused by the support that is provided to support the light guides at predetermined intervals.

A planar light source device of the present invention preferably includes: a plurality of light guides being provided such that longer sides thereof are arranged in parallel with each other with a gap therebetween; a plurality of light sources each of which causes light to enter at least one of opposite end surfaces of the light guide in the longitudinal direction of the light guide; a plurality of optical path changing sections being provided on a light emission side of the light guide or on a reflecting sheet side opposite the light emission side, to extract light guided inside the light guide; a diffusing member which diffuses light emitted from the light guides; and supports for supporting the light guides at predetermined intervals, the supports having the same optical properties as the diffusing member.

In this case, since the optical properties of the support become equal to those of the diffusing member. This makes it possible to make lower luminance in the gap between the light guides less noticeable.

Each of the supports has fixing members disposed between the light guides, and the fixing members make one light guide caught therebetween to fix the light guide.

According to the above arrangement, each of the supports has fixing members disposed between the light guides, and the fixing members make one light guide caught therebetween to fix the light guide. With this arrangement, the fixing member exists in the gap between the light guides. This ensures the light guides to be supported at predetermined intervals.

In addition, the support has light-transmissive property and light-scattering property. Because of this, even with the existence of the fixing member in the gap between the light guides, light emitted from the side walls of the light guide is not blocked. That is, even with the existence of the fixing member exists in the gap between the light guides, it is possible to curb lower luminance caused by the fixing member.

The fixing members are preferably made from an elastic material that energizes the light guide to be caught between the fixing members.

In this case, the fixing members are made from an elastic material that energizes the light guide to be caught between the fixing members, which enables the light guide to be reliably supported at their side surfaces. With this arrangement, even when the gap between the light guides increases, the light guide is less likely to displace from a predetermined position. This makes it possible to reduce luminance unevenness caused by the displacement of the light guide from a predetermined position.

Advantageous Effects of Invention

The present invention includes: a plurality of light guides being provided such that longer sides thereof are arranged in parallel with each other with a gap therebetween; a plurality of light sources each of which causes light to be directed from at least one of opposite end surfaces of the light guide in the longitudinal direction of the light guide; a plurality of optical path changing sections being provided on a light emission side of the light guide or on a reflecting sheet side opposite the light emission side, to extract light guided inside the light guide; and supports for supporting the light guides at predetermined intervals, the supports being made from a light-transmissive and light-scattering material. This makes it possible to reduce the occurrence of lower luminance caused by the support that is provided to support the light guides at predetermined intervals. This yields the effect of eliminating luminance unevenness on the entire light emission surface of the planar light source device.

DESCRIPTION OF EMBODIMENTS

The following will describe one embodiment of the present invention. In the present embodiment, the following description assumes that a planar light source device of the present invention is applied to a light source module for a liquid crystal display apparatus as an electronic apparatus.

Figure 2:
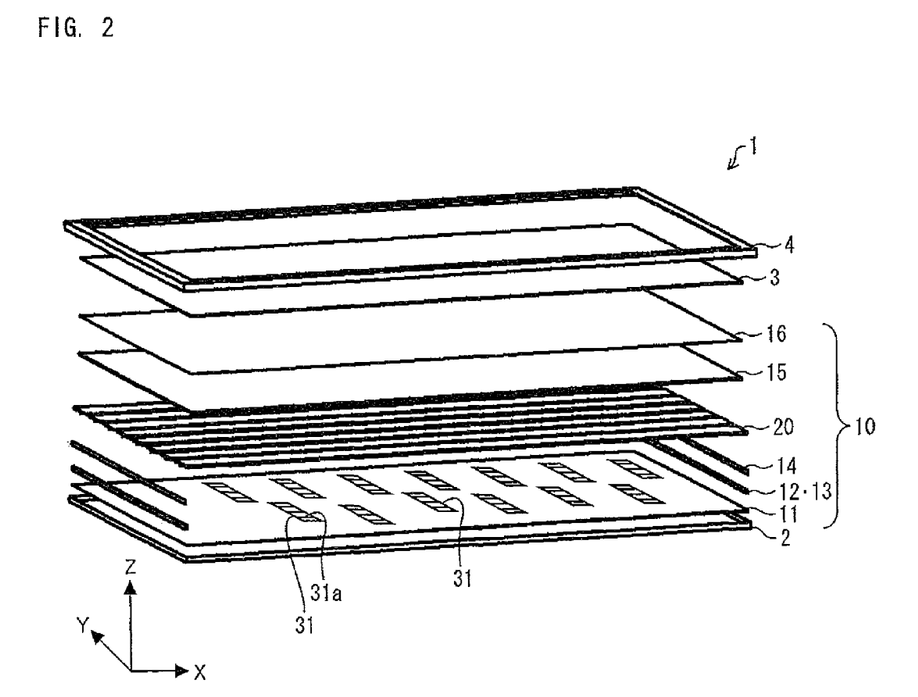
FIG. 2 is an exploded perspective view of a liquid crystal display apparatus in which the planar light source device shown in FIG. 1 is used as a light source module.

FIG. 2 is an exploded perspective view of a liquid crystal display apparatus 1.

The liquid crystal display apparatus 1, as shown in FIG. 2, is composed of a chassis 2, a light source module (planar light source device) 10, a light crystal panel 3, and a bezel 4 in the stated order from the bottom thereof. The light source module 10 is composed of a reflecting sheet 11 as a reflective plate, LEDs (Light Emitting Diodes) 12 as light sources, and LED substrates 13, reflectors 14, a light guide plate 20, a diffusing plate 15, and an optical sheet group 16. Note that the present invention does not necessarily require the optical sheet group 16.

Figure 3:
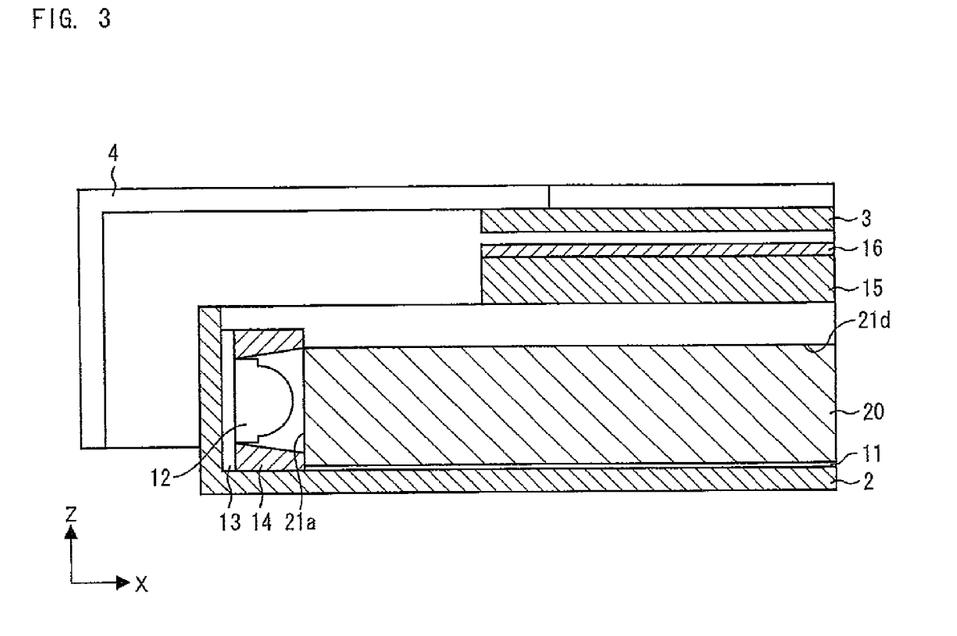
FIG. 3 is a cross-sectional view showing the structure of part of the liquid crystal display apparatus.

As shown in FIG. 3, the LEDs 12, the LED substrates 13, and the reflectors 14 are provided at edges of the light guide plate 20. This causes light from the LED 12 to enter one end surface 21a of the light guide plate 20, and is emitted from the emission surface 21d of the light guide plate 20, pass through the diffusing plate 15 and the optical sheet group 16, and then illuminate the light crystal panel 3. Therefore, the light source module 10 of the present embodiment adopts a side-edge (also referred to as side-light) scheme.

The liquid crystal display apparatus 1 has the problem of moving image blur, as compared with a CRT (Cathode-Ray Tube) display apparatus. That is, in the CRT display apparatus, a non-light-emitting period where no light is emitted at a pixel is provided between a light-emitting period for the pixel in a given frame and a light-emitting period for the pixel in the subsequent frame. This causes less afterimages. On the other hand, the liquid crystal display apparatus 1, which adopts a "hold-type" display scheme where such a non-light-emitting period is absent, generates afterimages. The afterimages are perceived as moving image blur by the user.

In view of this, for a backlight-type liquid crystal display apparatus 1, a backlight blinking has been proposed. The backlight blinking is a technique that enables insertion of black display between image displays by sequential shutoff of separate light sources of the light source module 10, which serves as a backlight, in sync with supply of a video signal to the liquid crystal panel 3. The backlight blinking realizes a pseudo impulse-type display and thus enables reduction of afterimages.

Figure 4:
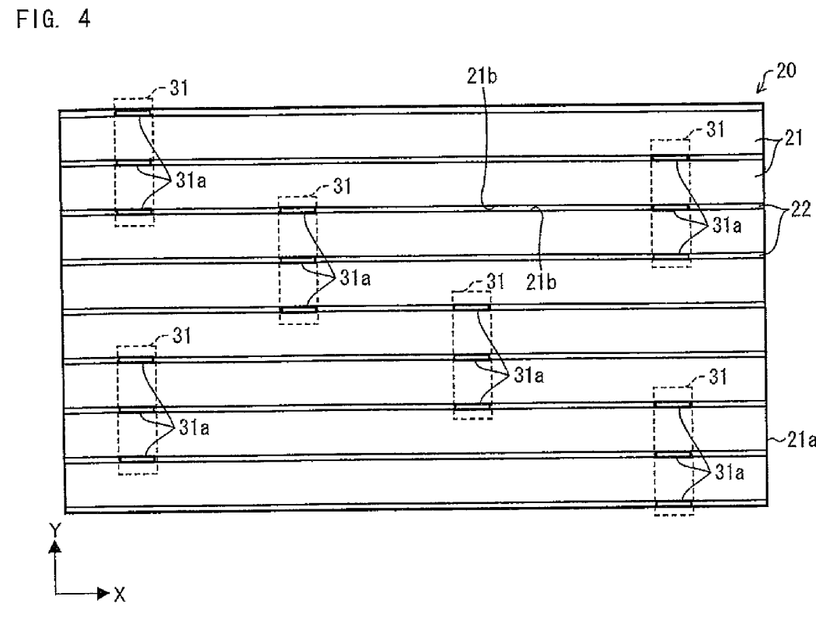
FIG. 4 is a plan view showing the structure of a light guide plate in the light source module.

In order to perform backlight blinking, the light source module 10 of the present embodiment, as shown in FIG. 4, includes a plurality of light guides separated from the light guide plate 20, and these light guides 21 are disposed such that longer sides thereof are arranged in parallel with each other with a gap 22 therebetween. Therefore, in the present embodiment, as shown in FIG. 3, light emitted from the LED 12 is directed from thick-walled parts 21c (described later) of one end surfaces 21a of the respective light guides 21 in the longitudinal direction. Note that the light is unnecessarily directed from the end surface 21a. In an alternative case, the light may be directed from the other end surface in the longitudinal direction of the light guide plate 20. In another alternative case, the light may be directed from both of the end surfaces, i.e. the end surface 21a and the other end surface. That is, in the present invention, it is essential only that the light is directed at least from the end surface 21a.

In order to arrange the plurality of separate light guides 21 of the light guide plate 20 such that their longer sides are in parallel with each other, gaps 22 are required each in the order of 1 to 2 mm in consideration of thermal expansion and manufacturing tolerances of the light guides 21.

Figure 9:
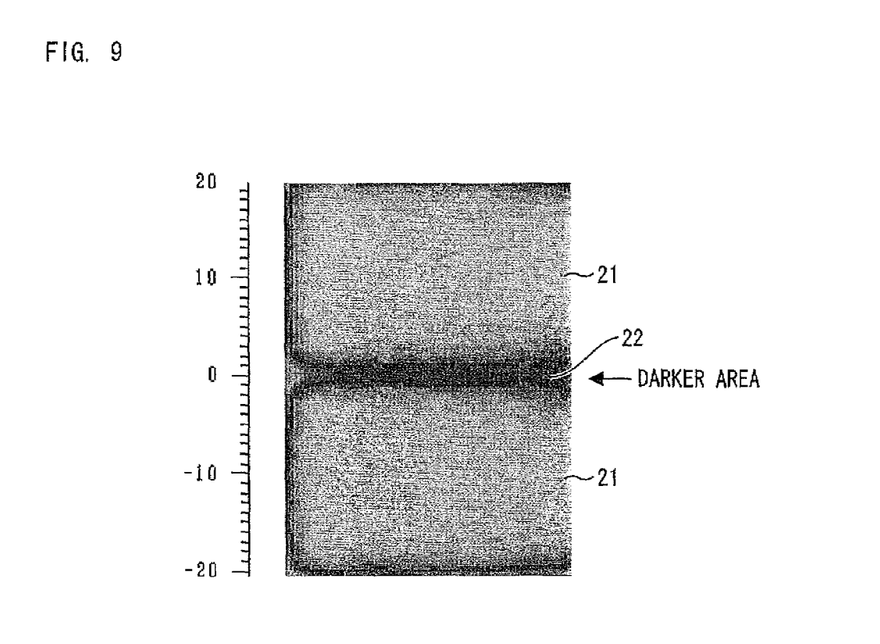
FIG. 9 is a plan view showing luminance unevenness that occurs in a gap between light guides in the conventional light source module.

However, leaving the gap 22 of such a length gives rise to the problem of the occurrence of luminance unevenness in the gap 22, as shown in FIG. 9

The reason for the occurrence of luminance unevenness in the gap 22 will be described with reference to FIG. 10, which shows a mechanism for causing light to emit from the light guides 21.

Figure 10:
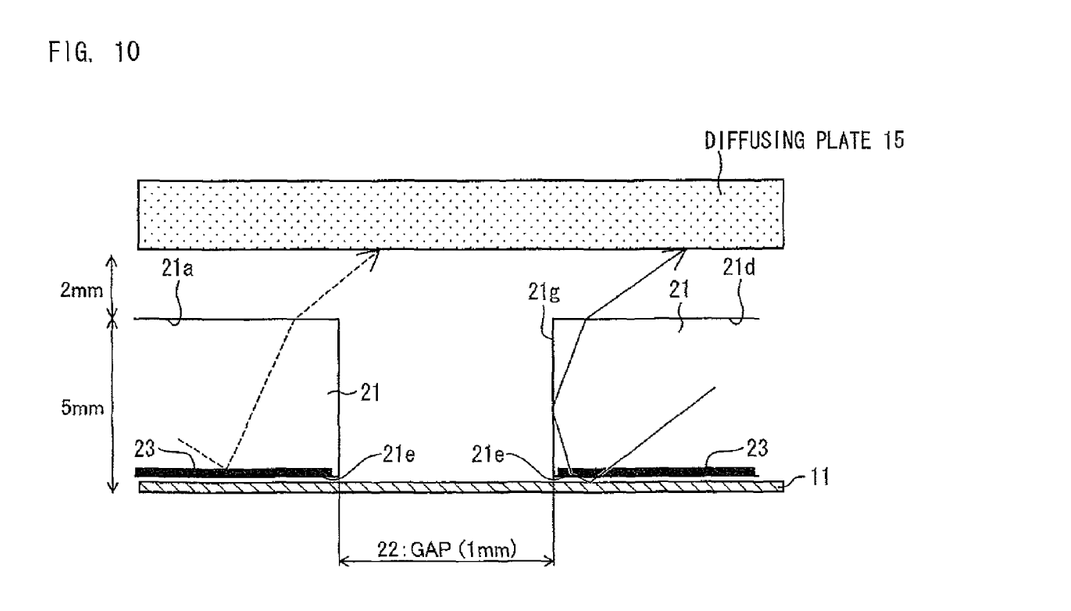
FIG. 10 is a cross-sectional view showing an optical path in end parts of the light guides of the light source module shown in FIG. 9.

As indicated by a dashed line arrow in FIG. 10, light traveling in the light guide 21 comes into collision with a light scatterer 23 and therefore changes its angle at which it travels in the light guide 21. This breaks all reflection conditions. Then, the light is emitted from the emission surface 21d or a counter surface 21e opposite the emission surface 21d to the outside of the light guide 21. Here, assume that a space between the counter surface 21e and the reflecting sheet 11 is substantially small. In this case, as indicated by a solid line arrow in FIG. 10, light having been emitted from the counter surface 21e of the light guide 21 is reflected by the reflecting sheet 11, and then re-enters the light guide 21. The light having re-entered the light guide 21 is reflected by a side wall surface 21g and is then re-emitted from the emission surface 21d.

As a result of this, it is difficult that the light reaches an area of the diffusing plate 15 above the gap 22 between the light guides 21. That is, as shown in FIG. 9, the area of the diffusing plate 15 right above the gap 22 becomes dark. Therefore, the luminance unevenness occurs.

Figure 5:
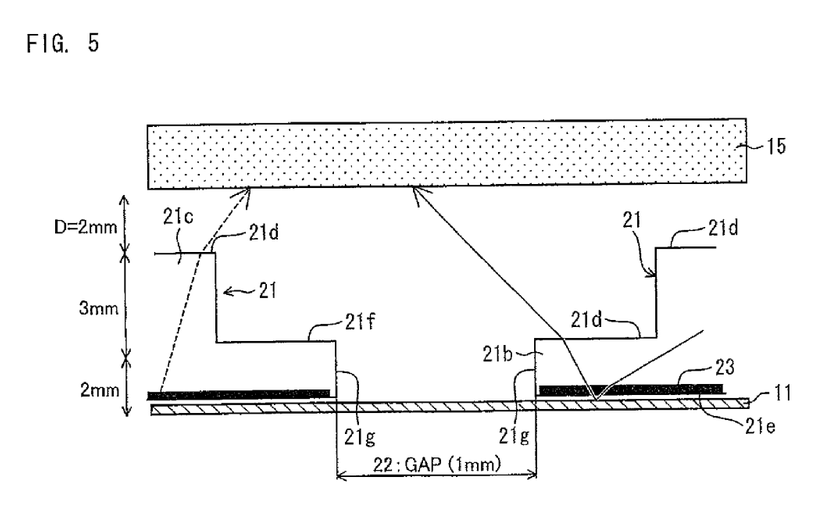
FIG. 5 is a cross-sectional view showing a light source module including the light guide plate, and showing an optical path in end parts of a plurality of light guides each having an absent part on the emission side.

In the present embodiment, in order to prevent the occurrence of luminance unevenness in the gap 22, as shown in FIG. 5, thin-walled parts 21b and 21b, which serve as opposite side end parts of the respective adjacent light guides 21, are formed to be thinner than thick-walled parts 21c, which serve as center parts of cross sections that are orthogonal to the longer sides of the light guides 21. As such, the light guide 21 of the present embodiment is substantially T-shaped in cross section because it has an absent part 21f in the side end part on the emission side or on the reflecting sheet side, and the light guide 21 consists of the thick-walled part 21c, which is formed to be thicker, and the thin-walled part 21b, which is formed to be thinner. In the present embodiment, the light guides 21 are disposed in such a manner that the thin-walled part 21b is nearer to the reflecting sheet 11. That is, the absent parts 21f are provided on light emission sides of the light guides 21.

The following will describe why the above arrangement can prevent the occurrence of luminance unevenness.

As shown in FIG. 5, assume that the absent parts 21f are provided on light emission sides of the light guides 21. In this case, as indicated by a broken line arrow in FIG. 5, light traveling in the thick-walled part 21c of the light guide 21 comes into collision with the light scatterer 23 and therefore changes its angle at which it travels in the light guide 21. This breaks all the reflection conditions. Then, the light is emitted from the emission surface 21d to the outside of the light guide 21 and travels toward the diffusing plate 15. However, through such an optical path, the light does not reach an area of the diffusing plate 15 above the center of the gap 22.

Meanwhile, in the case where there exist the absent parts 21f on the emission sides in the thin-walled parts 21b of the respective light guides 21, a large space between the emission surface 21d and the diffusing plate 15 can be provided by the absent parts 21f in the vicinity of the gap 22. As such, as indicated by a solid line arrow in FIG. 5, light traveling in the light guide 21 comes into collision with the light scatterer 23 and therefore changes its angle at which it travels in the light guide 21. This breaks all the reflection conditions. Then, the light is reflected by the reflecting sheet 11, which is provided below the counter surface 21e, and is emitted from the emission surface 21d of the thin-walled part 21b to the outside of the light guide 21. This makes it possible to easily illuminate the area of the diffusing plate 15 above the gap 22. Therefore, the unevenness in the gap 22 is less likely to occur.

Further, in the present embodiment, the diffusing plate 15 is provided above the emission surface 21d of the light guides 21 so that a space D of 2 mm, for example, is left between the diffusing plate 15 and the emission surface 21d of the light guide 21. With this arrangement, it is possible to reduce the luminance unevenness, as compared with the arrangement in which the diffusing plate 15 is brought into intimate contact with the emission surface 21d of the light guide 21.

Thus, the light source module 10 of the present embodiment includes: the plurality of light guides 21 being provided such that longer sides thereof are arranged in parallel with each other with a gap 22 therebetween; the plurality of LEDs 12 each of which causes light to be directed from at least one end surface 21a of the light guides 21 in the longitudinal direction of the light guides 21; and the plurality of light scatterers 23, as optical path changing sections, being provided on the light emission side of the light guides 21 or on the reflecting sheet 11 side opposite the light emission side, to extract light guided inside the light guide 21. Besides, the thin-walled parts 21b, which serve as side end parts of cross sections orthogonal to the longer sides of the light guides 21, are formed to be thinner than the thick-walled parts 21c, which serve as center parts of the cross sections orthogonal to the longer sides of the light guides 21.

That is, in the side-edge type (also referred to as side-light type) light source module 10, the plurality of light guides 21 constituting the light guide plate 20 are provided such that longer sides thereof are arranged in parallel with each other with a gap 22 therebetween. This causes low irradiance in the gap 22, resulting in the occurrence of luminance unevenness in the entire light guide plate.

However, the thin-walled parts 21b in cross sections orthogonal to the longer sides of the light guides 21, are formed to be thinner than the thick-walled parts 21c in the cross sections orthogonal to the longer sides of the light guides 21. This forms the absent parts 21f in the thin-walled parts 21b of the light guides 21.

With this arrangement, in the thin-walled parts 21b of the respective light guides 21, (i) light having been emitted from the light guide 21 or (ii) reflected light resulting from reflection of the light (i) by the reflecting sheet 11 passes through the absent part 21f of the light guide 21, thereby enabling illumination of the gap 22 between light guides 21 without re-entering the light guide 21.

Therefore, it is possible to provide the light source module 10 that enables avoiding lack of luminance in the gap 22 and enables reduction in the occurrence of luminance unevenness.

Further, in the light source module 10 of the present embodiment, provision of the absent parts 21f on the emission sides of the respective light guides 21 enables the thin-walled parts 21b of the respective light guides 21 to be formed thin.

With this, in the thin-walled parts 21b of the respective light guides 21, the light having been emitted from the light guide 21 passes through the absent part 21f of the light guide 21, thereby enabling illumination of the gap between the light guides 21 without re-entering the light guide 21.

According to the arrangement shown in FIG. 5, even when the gap 22 between the light guides 21 increases to some degree, it is possible to curb the lower luminance. However, if the light guides 21 are directly disposed without being fixed, the light guides 21 are displaced from predetermined positions. This causes luminance unevenness, resulting in difficulty in properly performing a pseudo impulse-type display.

In view of this, in the present embodiment, as shown in FIG. 2, a plurality of supports 31 for supporting the light guides 21 at predetermined positions are provided below the light guide plate 20 (on the reflecting sheet 11 side).

Figure 1:
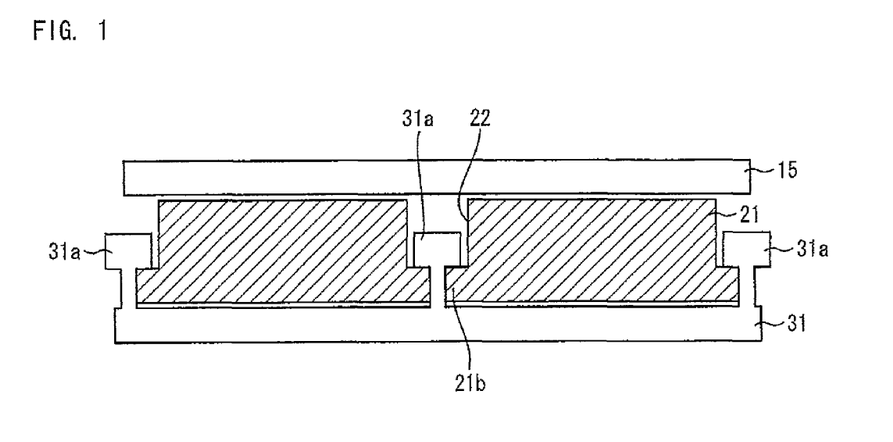
FIG. 1 is a schematic cross-sectional view schematically showing the structure of a planar light source device (light source module) of the present invention.

As shown in FIG. 1, the support 31 has fixing members 31a that make one light guide 21 caught therebetween to fix the light guide 21. The following description assumes that two light guides 21 are supported by one support 31 in the present embodiment. A shape of the support 31 will be described in detail later.

In a case where the support 31, which is provided to support the light guide 21, is made from a material that blocks light emitted from the light guide 21, light having been emitted from the light guide 21 does not illuminate the diffusing plate 15 in an area where the support 31 is provided. This results in lower luminance.

In order to curb the occurrence of luminance unevenness caused by provision of the support 31 as described above, the support 31 is formed from a light-transmissive and light-scattering material. This material is preferably a material having a light-scattering property, as in the case with the diffusing plate 15 disposed above the light emission surface.

As such, the support 31 is formed from a light-transmissive and light-scattering material. This makes it possible to curb the occurrence of luminance unevenness caused by the support 31, particularly, the occurrence of luminance unevenness caused by the fixing members 31a of the support 31. The reason for this will be described below.

As shown in FIG. 1, the support 31 is provided in such a manner that the fixing member 31a is disposed in a space (gap 22) between the thin-walled parts 21b of the respective light guides 21. In a case where the support 31 provided in the gap 22 between the light guides 21 is made from a material that does not allow light to pass through it (highly reflective polycarbonate, etc.), as described in BACKGROUND ART, light emitted from the side wall surface 21g of the light guide 21 is blocked by the support 31. This clearly forms light and dark patterns in and around the support 31, resulting in luminance unevenness. This means the occurrence of luminance unevenness caused by the fixing member 31a of the support 31.

On the other hand, the support 31, by virtue of its light-transmissive property, does not block the light emitted from the side wall surface 21g of the light guide 21. In addition, by virtue of its light-scattering property, the support 31 scatters the light emitted from the side wall surface 21g. This makes it possible to irradiate the gap 22 between the light guides 21 with light having uniform luminance.

Consequently, it is possible to reduce the occurrence of luminance unevenness caused by the support 31 that is provided to support the light guides 21 at predetermined intervals, particularly the occurrence of luminance unevenness caused by the fixing members 31a.

Further, the fixing members 31a of the support 31 are each disposed between the light guides 21, and make one light guide 21 caught therebetween so as to fix the light guide 21.

With this arrangement, the fixing member 31a exists in the gap 22 between the light guides 21. This ensures the light guides 21 to be supported at predetermined intervals.

Still further, since the support 31 is made from a material having the same optical properties as the diffusing plate 15, the optical properties of the support 31 become equal to those of the diffusing plate 15. This makes it possible to make lower luminance in the gap between the light guides 21 less noticeable.

As a result of this, it is possible to attempt further decrease in luminance unevenness in the light emission surface of the light source module.

For example, with use of (i) the support 31 produced from a highly reflective PC (polycarbonate) and (ii) the support 31 produced from the same material used for the diffusing plate 15, the degrees of luminance unevenness that occur around both of the supports 31 have been evaluated. The evaluation results are shown in (a) and (b) of FIG. 6.

Figure 6:
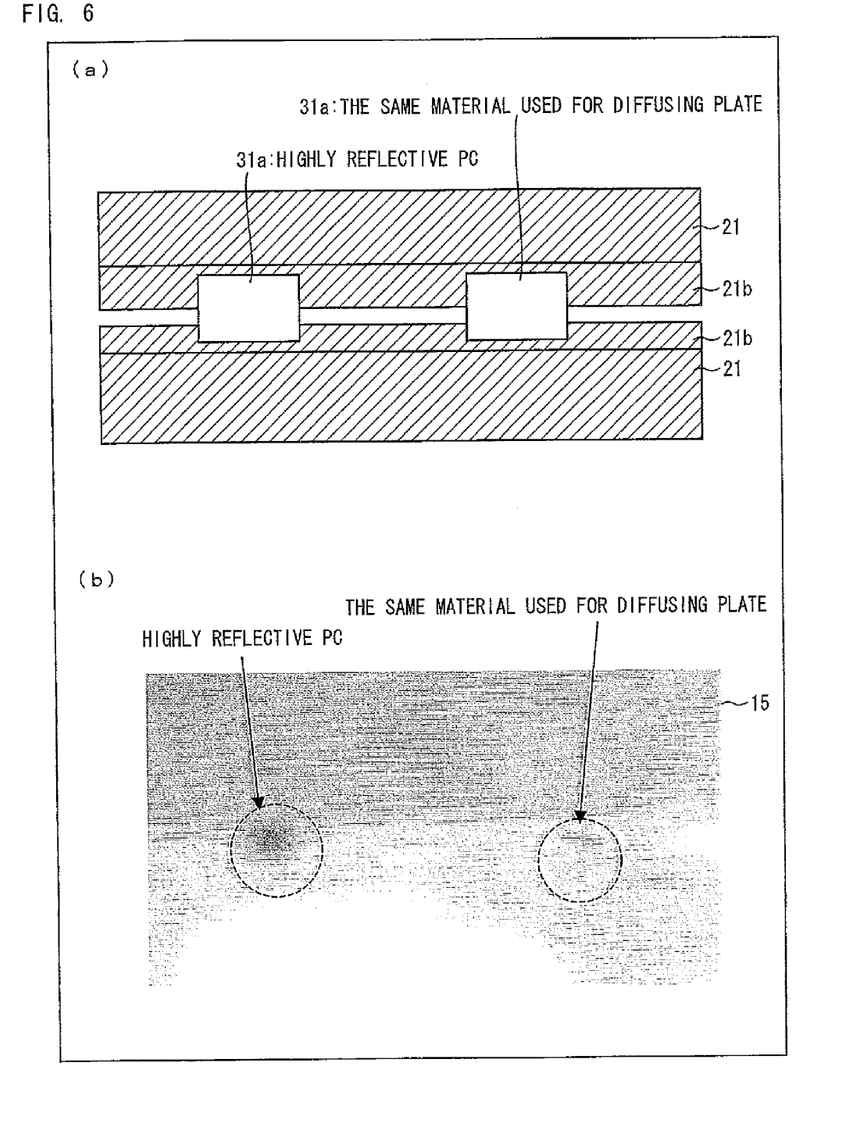
FIG. 6 is an explanatory plan view for explaining results of evaluation of luminance unevenness caused by different materials for the support that supports the light guides.

(a) of FIG. 6 is a plan view of light guides 21 when seen from above in a state where the diffusing plate is removed, and shows the state where the fixing members 31a produced from different materials are exposed. (b) of FIG. 6 is a view when the plan view showing the state shown in (a) of FIG. 6 is seen through the diffusing plate 15.

As is clear from (b) of FIG. 6, the fixing member 31a produced from the same material used for the diffusing plate 15 does not block light from the light guides, and therefore enables curbing luminance unevenness caused by lower luminance.

As described previously, the support 31 is preferably produced from the same material used for the diffusing plate 15 that is used together with the support 31, from the viewpoint of reducing luminance unevenness. However, to yield the effect of reducing luminance unevenness caused by the support 31, the support 31 produced from a light-transmissive and light-scattering material is good enough.

The material for the support 31 is preferably the same as that for the diffusing plate 15, which is a diffusing member. Therefore, the material for the support 31 is PC (polycarbonate), PS (polystyrene), PMMA (polymethylmethacrylate), or the like, all of which can be a possible material for the diffusing plate 15. Alternatively, the support 31 may be formed from a material using scattering property of the material itself, a light-transmissive material containing scattering components such as silica, or a material having a surface that exerts scattering property. However, the materials for the diffusing plate 15 and the support 31 as used in the present invention are not limited to the above-described materials, provided that they are light-scattering and light-transmissive materials. For example, a knit of light-transmissive fibers, etc. may be used as light-scattering materials.

The problems associated with the above arranged light source module 10 are not only the occurrence of luminance unevenness caused by the material for the support 31, but also the occurrence of luminance unevenness caused by displacement of the light guides from predetermined positions. For example, even though the material for the support 31 is appropriately selected for an attempt to curb lower luminance, displacement of the light guides from the predetermined positions causes luminance unevenness in the emission surface of the light source module. Thus, the occurrence of luminance unevenness in the emission surface of the light source module interferes with proper pseudo impulse-type display in a liquid crystal display apparatus. This results in degradation in display quality.

The following will describe the shapes of the support 31, for fixing the light guides 21 at predetermined positions with reliability.

For example, as shown in FIGS. 7(a) through 7(d), the support 31 is arranged as follows. That is, the fixing members 31a are provided at both ends and center of a light guide support surface (front surface) of a substantially rectangular base 31c. In addition, latches 31b are provided at both sides and center of the back surface of the base (fixing plate) 31c.

Figure 7:
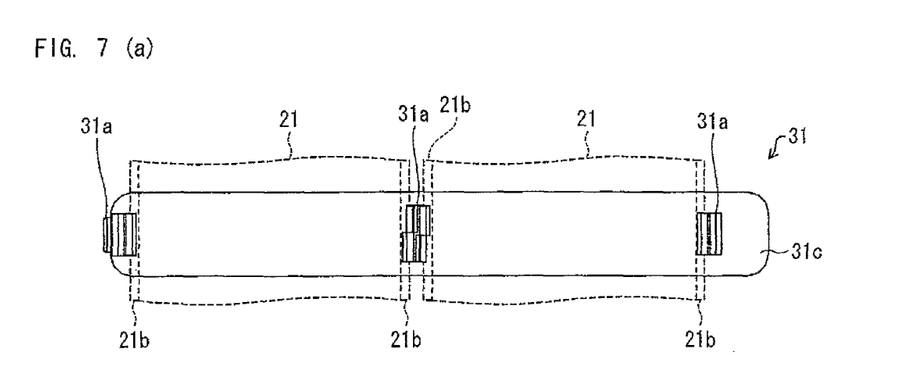
FIG. 7(a) is a plan view showing an example of a shape of the support.
FIG. 7(b) is a side view of the support shown in FIG. 7(a).
FIG. 7(c) is a bottom view of the support shown in FIG. 7(a).
FIG. 7(d) is a side view of the support shown in FIG. 7(a).

The fixing members 31a provided at one of the ends of the front surface of the base 31c and at the center of the front surface of the base 31c make one light guide 21 caught therebetween so as to support and fix the light guide 21, while the fixing members 31a provided at the other end of the front surface of the base 31c and at the center of the front surface of the base 31c make another light guide 21 caught therebetween so as to support and fix the light guide 21. Therefore, in the above example, two light guides 21 are supported and fixed by one support 31.

Further, the latches 31b provided on the back surface of the base 31c are engaged in corresponding latch holes (not shown) provided on the chassis 2 (FIG. 2), so that the support 31 is fixed to the chassis 2.

To fix the support 31 to the chassis 2, part of the reflecting sheet 11 provided between the support 31 and the chassis 2 needs to have openings. For example, openings are provided in the reflecting sheet 11 so that only the fixing members 31a of the support 31 can be protruded, and the base 31c is positioned under the reflecting sheet. As compared with the arrangement in which the support 31 is merely disposed on the reflecting sheet 11, the above arrangement eliminates the difference in surface level (irregularities) between the reflecting sheet 11 and the base 31c of the support 31, and enables the surface of the reflecting sheet 11 where the support 31 is formed to be kept flat, which thus eliminates reflection unevenness on the reflecting sheet 11.

The fixing member 31a is formed in such a shape that an edge part thereof is bent toward the side on which the light guide 21 is caught. As shown in FIG. 7(b), the edge part pushes down the thin-walled part 21b of the light guide 21.

However, the arrangement of the fixing member 31a as shown in FIG. 7(b) such that the thin-walled part 21b of the light guide 21 is pushed down from above may give rise to the following problems. That is, it is difficult to adjust the amount of force with which the thin-walled part 21b is pushed down. Further, if the force is weaker, the light guide 21 is not sufficiently fixed by the base 31c, and if the force is stronger, the thin-walled part 21b is damaged.

Figure 8:
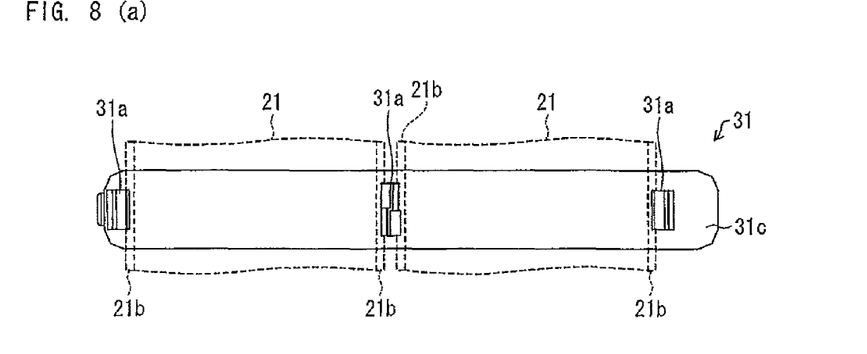
FIG. 8(a) is a plan view showing another example of a shape of the support.
FIG. 8(b) is a side view of the support shown in FIG. 8(a).
FIG. 8(c) is a bottom view of the support shown in FIG. 8(a).

In view of this, as shown in FIGS. 8(a) through 8(c), for example, the fixing member 31a can be made bow-shaped in cross section, so that the thin-walled part 21b of the light guide 21 is caught by a bow-shaped protrusion. Note that the components of the support 31 shown in FIGS. 8(a) through 8(c) have the same shapes as those of the support 31 shown in FIGS. 7(a) through 7(c), except for the shape of the fixing member 31a.

According to the support 31 arranged as shown in FIGS. 8(a) through 8(c), the fixing members 31a are formed from an elastic material that energizes in such a direction that the light guide 21 is caught therebetween. This means that the fixing members 31a energize the side surface of the thin-walled part 21b of the light guide 21, not the upper surface of the thin-walled part 21b, which enables the light guide 21 to be reliably fixed without a risk of damage to the thin-walled part 21b.

Therefore, with use of the above-arranged support 31, it is possible to reliably prevent the light guides 21 from being displaced in the above-arranged light source module 10. Thus, it is possible to curb the occurrence of luminance unevenness caused by the displacement. This, in turn, curbs the occurrence of luminance unevenness in the emission surface of the light source module 10, which enables a liquid crystal display apparatus to perform pseudo impulse-type display in a proper manner.

The present invention is not limited to the aforementioned embodiments and is susceptible of various changes within the scope of the accompanying claims. Also, an embodiment obtained by suitable combinations of technical means disclosed in the different embodiments are also included within the technical scope of the present invention.

INDUSTRIAL APPLICABILITY

The present invention relates to: a light source module provided with a side-edge type (also referred to as side-light type) light guide plate through which light from a light source is planarly emitted; and an electronic apparatus including the light source module. For example, the present invention is applicable to a planar light source device as a light source module such as a backlight, and an electronic apparatus such as a liquid crystal display apparatus.

Reference Signs List
1 Liquid crystal display apparatus (electronic apparatus)
2 Chassis
3 Liquid crystal panel
4 Bezel
10 Light source module (planar light source device)
11 Reflecting sheet
12 LED (light source)
13 LED substrate
14 Reflector
15 Diffusing plate (optical path changing section)
16 Optical sheet group
20 Light guide plate
21 Light guide
21a End surface
21b Thin-walled part
21c Thick-walled part
21d Emission surface
21e Counter surface
21f Absent part
21g Side wall surface
22 Gap
23 Light scatterer (optical path changing section)
31 Support
31a Fixing member
31b Latch
31c Base (fixing plate)

The invention claimed is:
1. A planar light source device, comprising:
a plurality of light guides being provided such that longer sides thereof are arranged in parallel with each other with a gap therebetween;

a plurality of light sources each of which causes light to be directed from at least one of opposite end surfaces of the light guide in the longitudinal direction of the light guide;

a plurality of optical path changing sections being provided on a light emission side of the light guide or on a reflecting sheet side opposite the light emission side, to extract light guided inside the light guide; and supports for supporting the light guides at predetermined intervals, wherein the light guide is arranged to be substantially T-shaped in cross section orthogonal to the longer side of the light guide, such that a side end part thereof facing an adjacent light guide is formed to be thinner than a center part thereof so that the light guide has thin-walled parts on the emission side or the reflecting sheet side.

2. The planar light source device according to claim 1, wherein the supports are made from a light-transmissive and light-scattering material.

3. The planar light source device according to claim 1, further comprising:

a diffusing member which diffuses light emitted from the light guides, the supports having the same optical properties as the diffusing member.

4. The planar light source device according to claim 1, wherein each of the supports has fixing members disposed between the light guides, and the fixing members make one light guide caught therebetween to fix the light guide.

5. The planar light source device according to claim 4, wherein the fixing members are made from an elastic material that energizes the light guide to be caught between the fixing members.

* * * * *